June 5, 1962 A. BEKEY 3,038,092
HYSTERESIS SYNCHRONOUS ELECTRIC MOTOR
Filed June 22, 1959 4 Sheets-Sheet 4
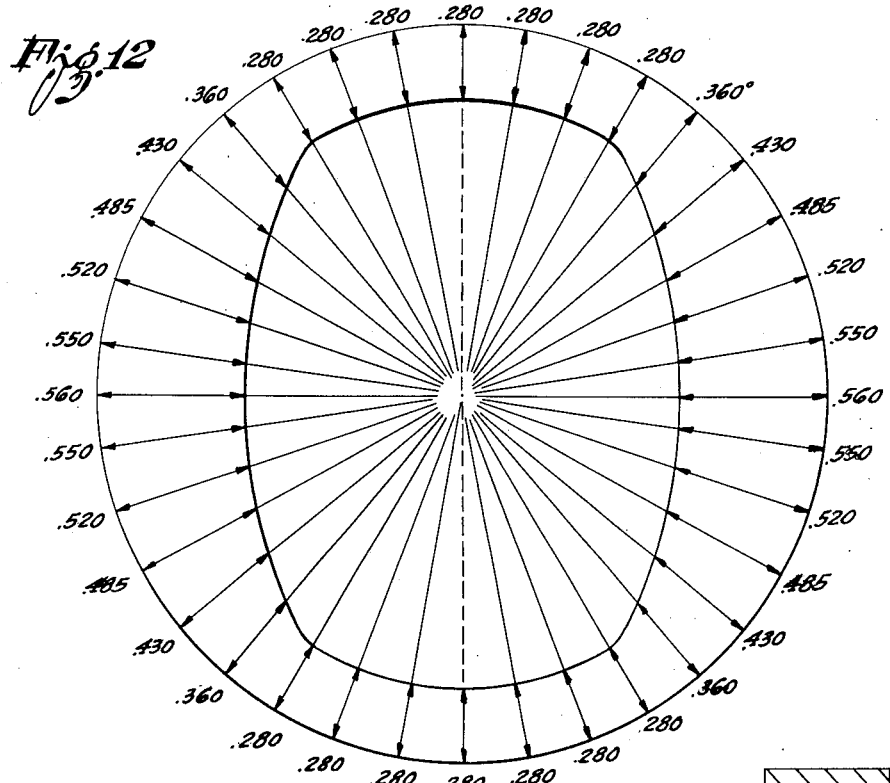
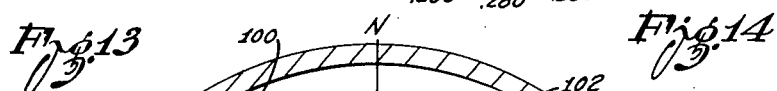
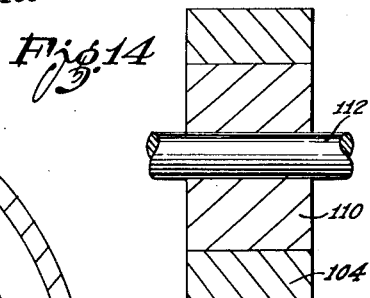
INVENTOR:
Andrew Bekey
By Smyth & Roston
Attorneys United States Patent Office 3,038,092
Patented June 5, 1962

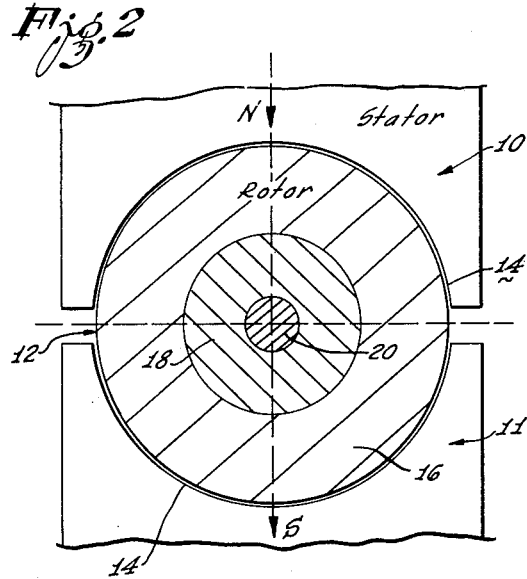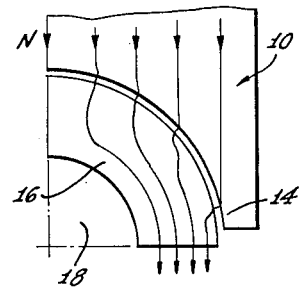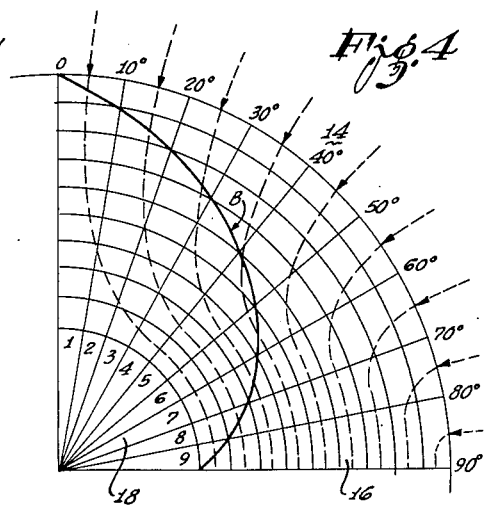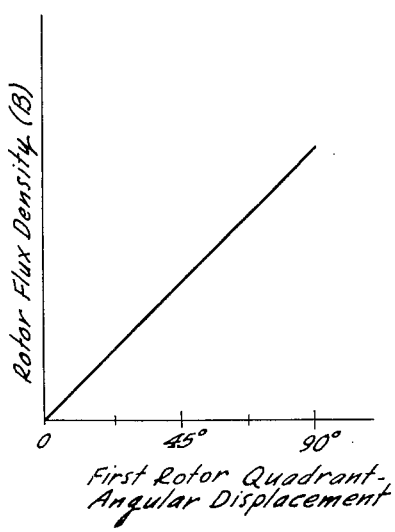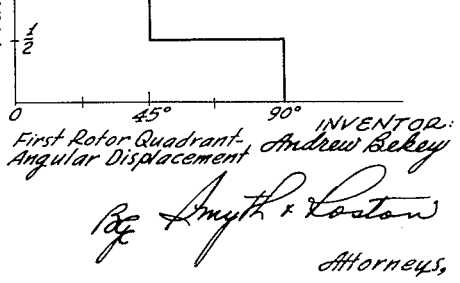

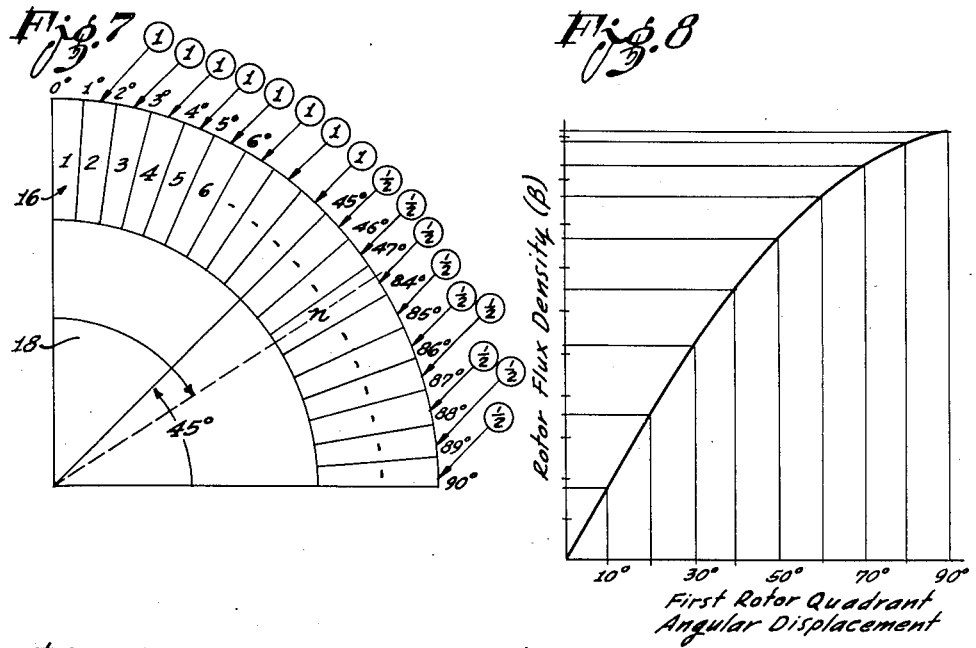
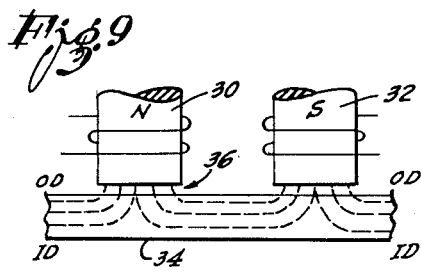
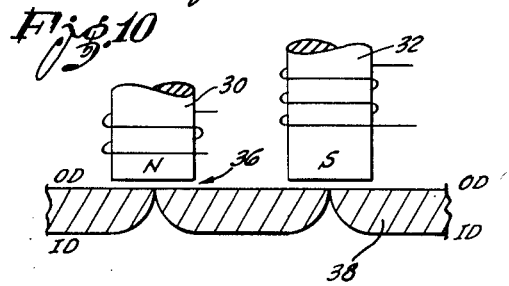
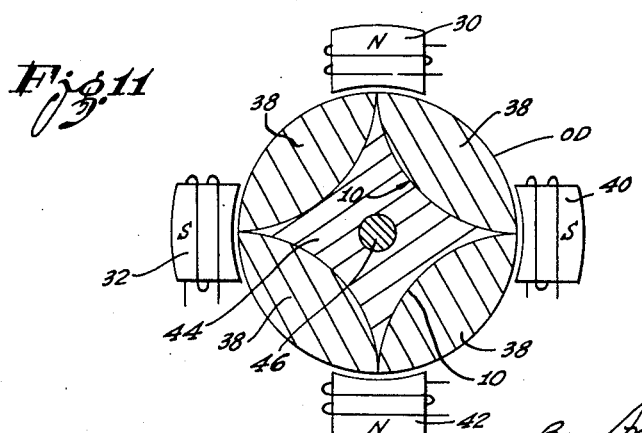

3,038,092
HYSTERESIS SYNCHRONOUS ELECTRIC MOTOR
Andrew Bekey, Los Angeles, Calif., assignor to Genisco Incorporated, Los Angeles, Calif., a corporation of California
Filed June 22, 1959, Ser. No. 821,767
12 Claims. (Cl. 310—162)

The present invention relates to alternating current synchronous motors of the hysteresis type, and it relates more particularly to an improved rotor construction for such a motor.

The rotor of the hysteresis motor is usually cylindrical in shape, and it is usually made up of a block of magnetic material of relatively high coercivity. Alternately, the rotor may be composed of a stack of punched laminations of high coercivity magnetic material. The rotor is mounted on the drive shaft of the motor, and it is supported by the drive shaft for rotation in the bore of the motor stator.

The stator of the hysteresis motor creates a rotating magnetic field which crosses the annular air gap between the stator and the rotor and which then enters the rotor. The rotating stator magnetic field exhibits one or more pairs of radial magnetic polarities depending upon the number of stator poles in the motor. These magnetic polarities of the rotating stator flux are equiangularly disposed about the rotational axis of the rotor, and they rotate about that axis.

A torque is created in the rotor of the hysteresis motor by hysteresis action in the active high coercivity magnetic rotor material. When the motor is first started, the rotating stator field induces magnetic poles in the rotor, and these poles slip with respect to the rotor until the rotor comes up to synchronous speed. At synchronous speed the rotor material becomes permanently magnetized, and it exhibits a plurality of radial magnetic poles at its peripheral surface. These radial magnetic poles of the rotor are equiangularly displaced from one another, and they correspond in number and in angular disposition to the radial poles exhibited by the rotating stator field.

In a hysteresis motor a stator flux is rotated about a rotor of relatively high coercivity active magnetic material, the poles induced in the rotor react with the rotating stator field. This reaction is such that a torque is exerted on the rotor. However, this torque is created only if an angular displacement exists between the poles of the rotating stator field and the magnetic poles induced in the rotor. This angular displacement is due to the hysteresis losses in the rotor as expressed by the area of the B/H hysteresis loop of the magnetic material forming the rotor. The torque developed is directly dependent upon such hysteresis losses, and this torque may be expressed by the following equation:

$$T = \frac{P.V.W_h}{2\pi} \quad (1)$$

where:

T is the torque exerted on the rotor
P is the number of pairs of poles induced in the rotor
V is the volume of the rotor
$W_h$ is the area of the B/H hysteresis loop of the active magnetic material in the rotor.

It will be noted from the Equation 1 that the torque T exerted on the rotor is independent of the frequency of the magnetizing current, and the torque is also independent of the rotational speed of the rotor. These particular characteristics render the hysteresis motor eminently suitable for many applications in the electronics control fields and in other areas.

It is usual in the prior art hysteresis motor to form at least a portion of the rotor out of magnetic material of relatively high coercivity, as mentioned above. This active portion of the rotor in the prior art hysteresis motors usually has an annular sleeve-like configuration. The annular active portion of the prior art rotor is usually concentrically mounted on a hub of magnetically inactive material, and the hub is keyed to the motor drive shaft. The resulting rotor assembly is supported by the drive shaft for rotation in the bore of the stator, as mentioned above.

An examination of Equation 1 will reveal that the torque per unit volume in a hysteresis motor having a particular number of pole pairs depends directly upon the area of the hysteresis loop of the active hysteresis portion of the rotor. This area, in turn, depends upon the magnetic condition under which the hysteresis material in the active magnetic portion of the rotor is operating.

As the magnetizing force of the stator of the hysteresis motor is increased, the hysteresis loss in the rotor will increase up to saturation of the rotor material, with resulting increase in the torque exerted on the rotor. However, practical design requirements dictate a particular maximum magnetizing force for a particular motor, and it is an important object of the present invention to provide a hysteresis rotor for such a motor in which maximum and most efficient use is made of the available magnetizing force.

For maximum available magnetizing force in a particular motor, the active portion of the rotor must be designed to be driven to a particular optimum magnetic density. This magnetic density should, for example, approach the saturating limit of the particular rotor but should not extend into the saturating region. If the magnetic density in the rotor is too high, the magnetic material of the rotor will be driven into its saturated region with resulting waste of the available magnetizing force insofar as the production of a hysteresis torque is concerned. On the other hand, if the magnetic density in the rotor is too low, the resulting hysteresis loop for the available magnetizing force has an area which is less than optimum with a resulting loss in the optimum production of the hysteresis torque.

It follows from the above considerations that in a given hysteresis motor with a given amount of magnetizing force available from the rotating stator flux, for maximum efficiency, the rotor must be constructed to be driven to a particular maximum magnetic flux density for optimum hysteresis loss and maximum hysteresis torque. It also follows that under conditions where the available magnetizing force varies around the rotor of the motor, the rotor must be constructed so that full use is made of the available magnetizing force at all points in the rotor material.

The prior art annular rotors exhibit a flux path of constant cross-sectional area for the magnetic forces from the stator which exist around the annular air gap between the rotor and the stator. As will be explained in more detail subsequently, even if the stator flux has a uniform distribution in the annular air gap, the provision of a constant cross-section for the flux in the rotor leads to a condition in which the flux density in the rotor changes through wide ranges at different angular positions around the rotor when the motor is operating at synchronous speeds. This results to a condition in which portions of the rotor are driven by the magnetomotive forces into saturation regions for a waste of the magnetomotive forces insofar as creating hysteresis torque is concerned; or portions of the rotor are driven in hysteresis loops of less than optimum area by the magnetizing forces so that less than optimum hysteresis torques are produced by the later portions on the rotor.

An important feature of the present invention is the provision of a hysteresis motor whose rotor is constructed to exhibit a uniform optimum magnetic flux density throughout its entire cross-sectional area, despite variations in the total flux carried by different portions of the rotor. The rotor of the improved hysteresis motor of the invention may be constructed to exhibit, therefore, a B/H hysteresis loop of optimum area uniformly throughout its entire cross-section for the optimum and most efficient production of hysteresis torque.

The improved rotor construction of the hysteresis motor of the invention enables maximum and most efficient use to be made of the magnetomotive forces available in the motor. This, in turn, results in a maximum torque output for a given magnetizing current in the stator of a particular motor. The improved hysteresis motor of the invention is, therefore, capable of producing greater torques at better efficiency as compared with a prior art hysteresis motor of similar parameters. Moreover, the hysteresis motor of the present invention is capable of producing increased hysteresis torque with reduced rotor volume and weight, as compared with a corresponding prior art motor.

The above and other features of the invention which are believed to be new are set forth with particularity in the appended claims. The invention itself, however, together with further objects and advantages thereof, may best be understood by a consideration of the following specification when taken in conjunction with the accompanying drawings.

In the drawings:

FIGURE 2 is a cross-sectional schematic view of a prior art type of hysteresis motor including a rotor having an annular active magnetic portion of substantially uniform cross-sectional area, and in which the rotating stator field is represented in one instantaneous position by a pair of stator poles constructed to provide essentially uniform flux distribution in the annular air gap of the motor;

FIGURE 3 is a schematic representation of the flux distribution in any one of the four quadrants of the rotor of FIGURE 2, the flux density of the illustrated rotor quadrant being shown as increasing from a minimum at one end to a maximum at the other end despite the uniform flux distribution in the annular air gap;

FIGURE 4 is a diagrammatic representation which is intended to illustrate more clearly and on a quantitative basis the varying flux density in the illustrated rotor quadrant of FIGURE 3;

FIGURE 5 is a graph illustrating the linear relationship between the increasing flux density in the rotor quadrant of FIGURE 3 for increasing angular displacements from a reference angular position in the rotor, and in the presence of a uniform flux distribution in the annular air gap of the motor;

FIGURE 6 is a graph illustrating a particular non-uniform air gap flux distribution, in which the flux in the annular air gap of the motor drops abruptly from a maximum value to a value of approximately 50% of maximum at points in the annular air gap;

FIGURE 7 is a diagrammatic representation of a rotor quadrant, similar to the representation of FIGURE 4, but in which weighting factors are included for taking care of changes in the flux in the air gap of the type illustrated in the graph of FIGURE 6;

FIGURE 8 is a curve illustrating a sinusoidal relationship between the increasing flux distribution in the rotor quadrant of FIGURE 3 for angular displacements in the rotor from a reference rotor position and in the presence of a sinusoidally distributed magnetic flux in the annular air gap;

FIGURE 9 is a developed schematic view of a hysteresis motor incorporating a prior art rotor of annular configuration and essentially constant cross-sectional area, the instantaneous position of the rotating stator flux being illustrated by physical magnetic poles in this view, and these serving to illustrate the flux distribution in the illustrated prior art rotor;

FIGURE 10 is a developed schematic view of a hysteresis motor, similar to the view of FIGURE 9, but having a rotor shaped in accordance with the invention to exhibit a uniform magnetic density throughout its entire cross-sectional area;

FIGURE 11 is a sectional view in schematic form of a four pole hysteresis motor, in which the rotating stator field is illustrated in an instantaneous position by physical magnetic poles, and which includes a hysteresis rotor shaped in accordance with the present invention to exhibit uniform magnetic density throughout its cross-sectional area;

FIGURE 12 is a cross-sectional view of a typical stamped rotor lamination for a two pole hysteresis motor, the illustrated rotor lamination being formed in accordance with the invention to have a varying section which is calculated with respect to the flux distribution the air gap of the motor so that the rotor may exhibit a uniform magnetic density in certain regions;

FIGURE 13 is a cross-sectional view of a two pole hysteresis motor constructed in accordance with the invention and which includes a rotor formed to have a configuration similar to the configuration of the rotor lamination of FIGURE 12; and FIGURE 14 is a longitudinal sectional view of the rotor assembly of the motor of FIGURE 13.

Figure 1:
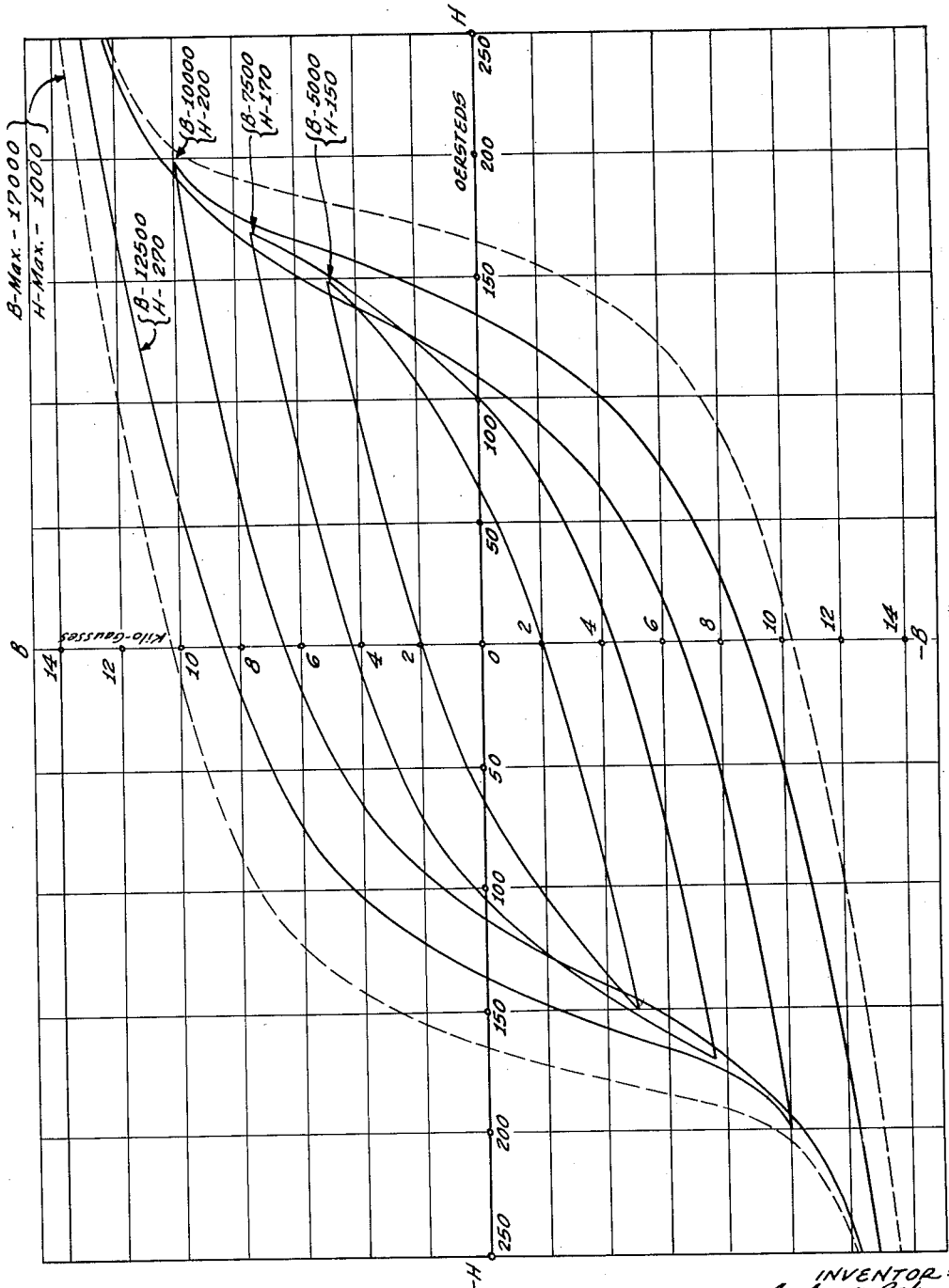
FIGURE 1 is a representation of a family of B/H hysteresis loop curves for a particular magnetic body; these curves showing the effect on the hysteresis loop, and on its circumscribed area, of the introduction of different maximum magnetomotive forces to the magnetic body.

The hysteresis loops of FIGURE 1, as mentioned, represent a family of B/H hysteresis curves for a particular magnetic material. The magnetic material selected, by way of example, was 17% cobalt steel. The particular test sample was in the form of a bar of one-half inch by three-eighths inch; annealed; RC33; hardening temperature 1750° F.; oil quenched. The illustrated loops show the effect of different magnetomotive forces on the area of the hysteresis loops of the particular material.

It will be observed from the curves of FIGURE 1 that the area of the hysteresis loops diminish at a greater rate than a corresponding diminishing magnetomotive force, so that the ratio between the hysteresis loop area and magnetomotive force is not constant. It will also be observed that an optimum area for a particular magnetomotive force occurs, when the magnetic material is driven substantially to, but not into, its saturation region. It follows, therefore, that for optimum hysteresis torque, which depends on optimum area of the hysteresis loop, the magnetic material of the rotor should be constructed to exhibit the particular magnetic densities required to provide the desired optimum hysteresis loop in the presence of different magnetomotive forces which normally exist around the rotor.

In the prior art hysteresis motor, if the dimensions of the active hysteresis portion of the rotor are chosen for an optimum area of the hysteresis loop for the available magnetomotive forces at a portion of maximum magnetic density in the rotor, then the magnetomotive forces in other portions in the rotor produce hysteresis loops which are less than optimum area. The active hysteresis portion of the rotor in a prior art hysteresis motor exhibits, therefore, a whole family of hysteresis loops, similar to the family shown in FIGURE 1. It follows then, that if some of the hysteresis loops in the prior art rotor exhibit optimum area for the available magnetomotive forces, others will exhibit less than optimum area, or others will exhibit saturation effects which diminish the efficient use of the existing magnetomotive forces.

As noted above, the present invention provides an improved rotor construction for a hysteresis motor. In the improved rotor of the present invention, the varying magnetomotive forces which normally exist in the rotor produce a uniform magnetic density in the rotor. This uniform magnetic density is such, for example, that all portions of the active magnetic part of the rotor are driven substantially to the same saturation region for optimum area of the corresponding hysteresis loop. This results in optimum rotor torque and in the most efficient use of weight and volume in the magnetic material forming the active portion of the rotor.

For purposes of explaining the principles underlying the present invention, a prior art type of hysteresis motor will first be considered. Such a prior art motor is illustrated in the cross-sectional, somewhat diagrammatic representation of FIGURE 2. The prior art hysteresis motor of FIGURE 2 is assumed to be of a two pole type, as mentioned above. As also mentioned, it is assumed that the rotating stator flux appears with essentially uniform distribution in the annular air gap of the motor.

The instantaneous position of the rotor of the stator flux is illustrated schematically in FIGURE 2 as a physical magnetic pole 10 circumscribing the top semi-circular portion of the rotor and a south magnetic pole 11 circumscribing the bottom of the semi-circular portion of the rotor. The pole 10 is illustrated as exhibiting north polarity in a radial direction with respect to the rotor, and the pole 11 is exhibited as exhibiting south polarity in the radial direction. These north and south radial polarities exhibited by the stator poles rotate about the axis of rotation of the rotor, and they provide radial flux lines of substantially uniform distribution in the annular air gap 14 of the motor.

The prior art motor of FIGURE 2 includes a rotor assembly 12 which is mounted for rotation in the bore of the stator 10 about the axis of rotation referred to above. The annular air gap 14 separates the rotor from the stator. The rotor assembly includes an annular active hysteresis portion 16, and this portion is composed of a magnetic material of relatively high coercivity, such as 17% cobalt steel. That particular material has a relatively high coercivity, and it is produced, for example, by the Simonds Saw and Steel Company of Lockport, New York. The material is designated by that company as their "No. 81" magnet steel.

The annular active hysteresis magnetic portion 16 of the prior art rotor assembly 12 is concentrically mounted on an annular hub 18. The hub 18 is usually composed of non-magnetic material, such as brass, and it is mounted on the drive shaft 20 of the motor. The drive shaft 20 is rotatably supported in appropriate bearings for rotation about the axis of rotation of the rotor. The portions 18 and 16 of the prior art rotor assembly form a unitary structure with the drive shaft 20, and these portions are supported by the drive shaft for rotation in the bore of the stator 10.

For purposes of the following discussion, the active hysteresis magnetic portion 16 of the prior art rotor of FIGURE 2 will be assumed to have infinite permeability, and it will also be assumed that there is no leakage in the motor. The diagrammatic representation of FIGURE 3 shows the flux distribution in the first quadrant of the rotor 16 of the prior art hysteresis motor of FIGURE 2. The flux distribution is symmetrical in the four quadrants of the rotor, so that only the first quardant need be considered, and for that reason only the first quadrant is shown in FIGURE 3.

As shown in FIGURE 3, which assumes that the stator pole 10 exhibits a north polarity at the particular illustrated instant, then the lines of magnetic force will flow from the stator pole 10 and will enter the annular air gap 14 in a radial direction. As the flux lines enter the rotor from the air gap, they follow the relatively high permeability path offered by the active portion 16 of the rotor, and they extend circumferentially around the annular configuration of that portion into the fourth quadrant of the rotor (not shown). The flux lines leave the fourth quadrant of the rotor and extend into the stator pole 11 which, at the illustrated instant, exhibits a south pole in the illustrated position in FIGURE 2.

The varying flux density in the fourth quadrant of the rotor is the same as the varying density of flux lines illustrated in FIGURE 3 for the first quadrant, except that the varying concentration in the fourth quadrant is in the opposite sense to that illustrated in the first quadrant. A similar varying flux density exists in the third and second quadrants of the rotor. It will be observed from the schematic illustration of FIGURE 3 that, even in the presence of a uniform flux distribution in the annular air gap 14, the flux density in the annular active portion 16 of the prior art rotor is not uniform. Instead, the flux density increases from the top of the quadrant in FIGURE 3 to the bottom. This change in flux density is shown on a more quantitative basis in the schematic illustration of FIGURE 4.

In the representation of FIGURE 4, the illustrated rotor quadrant of FIGURE 3 is divided into nine segments of 10° each, and the quadrant is also divided into 9 concentric sections. That is, the prior art active magnetic hysteresis portion 16 of the rotor is considered in FIGURE 4 to be composed of 9 concentrically arranged cylinders, with the cylinders being in contact with one another. The flux in the air gap 14 of the prior art hysteresis motor of FIGURE 2 is divided in 9 parts in the diagrammatic representation of FIGURE 4, with each part being represented by a single flux line. These air gap flux lines, as mentioned above, extend in a radial direction through the air gap, and they are disposed with essentially uniform distribution in the air gap.

As illustrated in FIGURE 4, in the 0°–10° segment the flux density is only one line per unit area, while in the 80°–90° segment the flux density is 9 lines per unit area. Each segment in the quadrant, progressing in a clockwise direction receives one flux line entering from the annular air gap 14, and each segment further carries in respective ones of its concentrical cylindrical sections all the other flux lines which enter the preceding segments. Since all the segments in this prior art rotor have the same number of concentric cylinder sections and all have the same dimensions, it follows that the flux density in any segment is proportional to the number of illustrated flux lines contained in that particular segment. The flux intensity in the illustrated quadrant of FIGURE 4 is represented by the curve $\beta$ which is referenced to the arcuate peripheral line of the rotor, that line forming a base for the curve $\beta$. It will be observed that the curve $\beta$ rises from zero at 0° to a maximum at 90°.

For the case of a uniform radial flux distribution in the annular air gap 14, as is realized in the prior art motor of FIGURE 2, the flux density in the first rotor quadrant increases from the 0° angular position to the 90° angular position in a direct proportional relationship, as illustrated by the straight line graph of FIGURE 5. However, the flux distribution in the annular air gap of a hysteresis motor is usually non-uniform, especially with respect to the peripheral surface of the rotor. The flux distribution and density in the prior art rotor quadrant for a non-uniform flux distribution in the annular air gap can be determined by modifying the procedure described above. In such a modification, a weighting factor is assigned to each flux line entering each segment of the quadrant under consideration. This weighting factor corresponds to the value of the distribution function of the field strength.

A non-uniform flux density in the annular air gap 14 over the first rotor quadrant is illustrated, for example, in FIGURE 6. In the illustrated case, the air gap flux density is assumed to drop to one-half of its original value at an angular displacement of 45° in the quadrant. FIGURE 7, which is a diagrammatic representation similar to the representation of FIGURE 4, then illustrates how the weighting factor is asigned to each magnetic flux line asumed to enter the rotor in the quadrant under consideration.

The following general equation may be used to calculate the flux densities in the prior art active rotor portion of uniform cross-section:

$$\beta_n = \sum_{i=1}^{i=n} (K)(M)(W_i) \qquad (2)$$

where:

$i$ is the $i$th segment in the quadrant
K is the area of the segment increments (assuming unity depths)
$W_i$ is the weighting function assigned to the flux line entering the $i$th segment to correspond to the flux density in the air gap at that segment (normalized to a maximum value of one)
$\beta_n$ is the magnetic density at the $n$th segment
M is the normalized strength of the magnetic field.

If the increments taken are small enough, Equation 2 then becomes:

$$\beta_\theta = \int_0^\theta K.M.(\theta).d\theta \qquad (3)$$

where:

$\beta_\theta$ is the flux density at an angular position on the rotor displaced $\theta°$ from a reference.

For a sinusoidal field distribution in the annular air gap, such that $$f(\theta) = \cos \theta; \ 0° \angle \theta \angle 90°$$

Then $$\beta_\theta = \int_0^\theta K.M. \cos \theta . d\theta \qquad (4)$$

$$= K.M. \sin \theta \qquad (5)$$

The relationship existing in Equation 5 is shown graphically in the curve of FIGURE 8. This latter curve represents the flux density at an angular position in a rotor quadrant for a sinusoidal flux distribution in the annular air gap. This curve, of course, refers to a prior art rotor section which includes an annular-shaped active hysteresis portion of uniform cross-sectional area. Accordingly, if a sinusoidal flux distribution exists in the annular air gap 14 of the prior art hysteresis motor of FIGURE 2, the magnetic density in the active annular portion 16 of the rotor 12 of uniform cross-sectional area changes at a rate which is a function of the sine of the angular displacements about the rotor, when such displacements are considered as a base for the curve, as shown in FIGURE 8.

It follows, therefore, that uniform magnetic density can be achieved in the rotor of a hysteresis motor by shaping the cross-sectional area of the active portion of the rotor in accordance with a complementary function of the annular air gap flux distribution at the outer peripheral surface of the rotor. While the sinusoidal air gap flux distribution has a general application, the square wave type of flux distribution such as referred to in conjunction with FIGURE 6 is often encountered. This latter type of distribution may be produced, for example, by transistorized power supplies.

The developed schematic view of FIGURE 9 of a two pole prior art type of hysteresis motor is illustrated as embodying a pair of stator poles 30 and 32 which, as mentioned, represent an instantaneous position of two opposite polarities in the rotating stator flux. The annular active portion of the rotor is shown by the developed section 34, and this section is shown as having a uniform cross-section in accordance with the prior art practice.

The line O.D. in FIGURE 9 marks the outer cylindrical surface of the prior art rotor 34 which defines one boundary of an annular air gap 36, and the line I.D. corresponds to the inner limit of the active magnetic material in the prior art rotor. The dotted lines in FIGURE 9 represent the lines of magnetic flux passing from the north stator polarity through the air gap into the rotor and back to the south stator polarity. The schematic illustration of FIGURE 9 shows that those parts of the rotor section 34 which are situated directly under the pole centers of the rotating stator magnetic flux have the lowest magnetic flux density, while those parts of the rotor section situated midway between the pole centers have the highest flux density.

In FIGURE 10, the rotor section 34 of FIGURE 9 has been replaced by a rotor 38. The rotor 38 is constructed in accordance with the concepts of the invention, and it differs from the rotor 34 of FIGURE 9 in that its I.D. line, instead of being a straight line, follows a predetermined curve. The curvature of the I.D. line of the rotor section 38 in FIGURE 10 should be calculated in accordance with Equation 5, assuming a sinusoidal flux distribution in the air gap 36.

The shape of the rotor section 38 is such that all areas within the active portion of the rotor section operate at uniform magnetic density. As noted above, for optimum hysteresis torque development, the rotor 38 is preferably constructed so that all areas of its active portion are driven near to, but not into, their saturation region.

The representation of FIGURE 11 is somewhat similar to that of FIGURE 10, with the exception that the motor is represented in FIGURE 11 in a circular section view, rather than in a developed view. Moreover, FIGURE 11 illustrates a four pole motor in which the stator poles 40 and 42 are added to the previous stator poles 30 and 32. The stator poles are positioned at right angles to one another. It is to be remembered that the representations of FIGURES 9–11 are diagrammatic and that the poles 30, 32 and 40, 42 actually represent instantaneous radial polarity centers exhibited by the rotating stator flux.

The inner contours of the active rotor portion 38 in FIGURE 11 are calculated to diminish in each quadrant from a maximum to a minimum cross-sectional area and in accordance with the sine of the angle from the circular O.D. line, when that line is taken as an abscissa. As illustrated, the configuration of the rotor quadrant between each pair of poles is the same. In each instance, the cross-section of the active material in the rotor approaches zero under the center of each pole, and the cross-section of the active material rises in the illustrated configuration to a maximum between each pair of poles.

The active rotor section 38 is illustrated in FIGURE 11 as being mounted on a hub 44 of non-magnetic material. The hub, in turn, is mounted on a drive shaft 46. As in the previous embodiments, the drive shaft 46 is rotatably mounted on appropriate bearings, and the drive shaft supports the rotor assembly for rotation in the bore of the stator.

For operation at sub-synchronous speeds, the illustrated zero cross-sectional area portions of the active rotor section in FIGURE 11 should have a finite area. For example, this cross-sectional area at the minimum positions should preferably be such that the magnetic flux density therein is less than 100,000 lines per square inch.

As a further consequence of the shape of the active rotor section 38 in FIGURE 11, the magnetic symmetry of the usual prior art hysteresis rotor is disturbed and a pronounced polar saliency is achieved. This saliency also assists in providing additional torque, and it also helps to reduce rotor hunting in the motor. Moreover, this saliency effect in the rotor of the invention provides for synchronous lock-in of the rotor to occur at a particular pre-established angular relationship between the drive shaft and the rotating stator flux. This means that the rotor of the invention will lock-in with the rotating stator flux with the required angular inter-relationship between the rotor and stator flux so that the rotor cross-sectional areas are properly disposed to provide the desired uniform flux densities in the rotor.

It should be pointed out that the improved rotor construction of the invention, as shown schematically in FIGURES 10 and 11 may be carried out without disturbing the outer cylindrical surface of the rotor in any way. The rotor of the illustrated embodiment of the invention, therefore, preserves the cylindrical shape of the prior art rotor to achieve the desired salience effects and without disturbing the dimensions or configuration of the annular air gap between the rotor and the stator, or disturbing its uniform width. However, it is clear that, when so desired, the required uniform magnetic density in the rotor can be achieved by shaping the outer surface of the rotor.

A constant magnetic density rotor incorporating the concepts of the invention may be manufactured, for example, by casting the rotor in a pattern built to the required configuration. Alternately, the rotor may be formed by stamping out rotor laminations from appropriate sheet metal, which laminations are later stacked to form the rotor. When such stampings are used, the die utilized to stamp out the internal diameter configuration of the rotor laminations can also be used to stamp out laminations of non-magnetic material to form the mating hub 44 which fits between the active rotor section 38 and the shaft 46.

It is apparent from the foregoing description, that hysteresis rotors can be constructed in accordance with the concepts of the invention for uniform magnetic density, regardless of the flux distribution in the air gap, so long as the flux distribution in the air gap can be calculated. As most hysteresis motors operate with a near sinusoidal flux distribution in the air gap, the following description will be directed to a constructed embodiment of the invention in which the air gap exhibits a substantially sinusoidal distribution of air gap flux.

The constructed embodiment of the invention has been tested, and that embodiment demonstrated conclusively that a hysteresis rotor constructed in accordance with the present invention to have a uniform flux density throughout its entire cross-sectional area produces more torque for less weight, as compared with a prior art rotor of constant cross-sectional area, when equal magnetizing currents are used. By the same token, the rotor of the present invention in its constructed embodiment required less magnetizing current to provide a particular torque than the magnetizing current required by the corresponding prior art motor to cause its uniform sectional area rotor to produce the same torque.

To test the performance of a motor constructed in accordance with the invention, two rotors and a single stator were constructed. Both rotors were formed of the same magnetic material, and both were heat treated for the same length of time and in the same process. Both rotors were provided with the same outer diameters and with the same length. However, one of the rotors was made to have an annular active magnetic portion in accordance with prior art practice and with a uniform cross-sectional area. The other rotor, however, was provided with an active portion having a cross-sectional area which varied from point to point along a calculated curvature and in accordance with the teaching of the invention.

The stator of the constructed test motor was a two pole, 60 c.p.s., 3 phase type. The stator was provided with a bore of 2.925 inches and a length of active material of 1 inch. The cross-sectional configuration of the rotor constructed in accordance with the invention was as illustrated in FIGURE 12. The active material in both the rotors was a 17% cobalt steel.

Using the characteristic curves for the rotor material, and assuming a sinusoidal flux distribution in the air gap with a maximum flux density of 75 kilogauss in the rotor, the following values and characteristics were calculated, and the accuracy of the calculations was conclusively demonstrated during the tests:

| | Prior Art Rotor | Rotor of Present Invention |
|---|---|---|
| Volume of active rotor material, cu. in. | 4.11 | 3.06 |
| Hysteresis loss ($W_h$) Joules/cu. in. cycle | .183 | .313 |
| Torque, oz. in. | 17 | 22.5 |
| Magnetizing ampere, turns/inch | 765 | 510 |
| Torque per cu. in. of material | 4.12 | 7.4 |

The sectional views of one embodiment of the invention shown in FIGURES 13 and 14 illustrate that embodiment as including a stator 100. The stator has a plurality of radially disposed slots 102, and these slots extend around the stator at equiangular positions. The slots 102 are of the open ended type, and the open ends of the slots extend into the bore of the stator through its inner annular surface. The stator winding is supported within the slots 102. In the illustrated embodiment, this winding produces a rotating magnetic flux in the stator bore which exhibits a single pair of radial polarity centers.

A rotor assembly is mounted for rotation in the bore of the stator 100. This assembly includes an active magnetic rotor section 104 which is shaped in accordance with the configuration of FIGURE 12. This active magnetic section of the rotor is formed of a magnetic material of relatively high coercivity. As mentioned above, an appropriate material for that purpose is 17% cobalt steel. As also mentioned above, the active magnetic section 104 of the rotor may be formed from an appropriate casting of the selected magnetic material, or by a stack of punched laminations of the material.

The outer peripheral surface of the magnetic rotor portion 104 has a cylindrical configuration, and this surface defines an annular air gap 106 with the inner annular surface of the stator 100. This air gap, because of the cylindrical configuration of the peripheral surface of the rotor, has a desired uniform width. The inner annular surface of the rotor is shaped, as mentioned, in accordance with the curve of FIGURE 12, so that the cross-sectional area of the active section 104 will be such that uniform magnetic density exists in that section.

The active magnetic rotor section 104 is supported on a hub 110. The hub 110 is at least partially formed of non-magnetic material, and it has an outer surface which coincides with the inner surface of the active magnetic section 104. This permits the active magnetic section 104 to be concentrically mounted on the hub 110. The hub 110, in turn, is mounted on a drive shaft 112. The drive shaft 112 is rotatably mounted in appropriate bearings, and it serves to support the rotor assembly for rotation in the bore of the stator 100.

In accordance with the concepts and principles described above, the creation of a rotating magnetic field in the annular air gap 106 produces essentially uniform magnetic flux density throughout the non-uniform cross-sectional part of the active magnetic section 104 of the rotor. This flux density is such that an optimum area hysteresis loop is produced for the production of optimum hysteresis torque.

The invention provides, therefore, an improved alternating current synchronous motor of the hysteresis type. The improved motor of the present invention is such that optimum use is made in the rotor of the available magnetizing forces. The net result is that motors constructed in accordance with the present invention are capable of producing greater hysteresis torques than the prior art hysteresis motors, and of accomplishing this at reduced motor sizes and with reduced volume and weight of active material in the rotor itself.

I claim:

1. In alternating current apparatus of the hysteresis type, the combination of: a stator structure having a bore and including a stator winding for producing a rotating magnetic flux in said bore, a rotor mounted for rotation within the bore of the stator in concentric relationship with the stator and defining an annular air gap with the stator, said rotating magnetic flux having a particular distribution in said air gap and exhibiting a predetermined number of angularly displaced radial polarity centers, and an active component included in the rotor having an annular configuration and of a varying cross-sectional area, said active rotor component being composed of hysteresis magnetic material of a particular coercivity and presenting a path of essentially uniform flux density to the rotating flux in said stator bore during synchronous operation of the motor.

2. In an alternating current synchronous motor of the hysteresis type, the combination of: a stator structure having a bore and including a stator winding for producing a rotating magnetic flux in said bore, a rotor rotatably mounted within the bore of the stator in concentric relationship with the stator and defining an air gap with the stator, said rotating magnetic flux having a particular distribution in said air gap and exhibiting a predetermined number of angularly displaced radial polarity centers, and an active component included in the rotor and having an annular configuration and a cross-sectional area which diminishes from a maximum at certain angular positions on the rotor to a minimum at other angular positions on the rotor, said certain angular positions on the rotor being disposed between the radial polarities of the rotating magnetic flux during synchronous operation of the motor and said other angular positions being substantially in angular alignment with said radial polarities during such synchronous operation, said active rotor component being composed of hysteresis magnetic material of a particular coercivity and presenting an essentially uniform flux density path to the rotating flux in said stator bore during synchronous operation of the motor.

3. In an alternating current synchronous motor of the hysteresis type, the combination of: a stator structure having a bore and including a stator winding for producing a rotating magnetic flux in said bore, a rotor rotatably mounted within the bore of the stator in concentric relationship with the stator and defining an annular air gap with the stator, said rotating magnetic flux having an essentially uniform distribution in the air gap and exhibiting a predetermined number of angularly displaced radial polarity centers, and an active component included in the rotor and having an annular configuration and a varying cross-sectional area which diminishes in a substantially linear relationship with respect to different angular positions on the rotor from a maximum at certain angular positions on the rotor to a minimum at other angular positions on the rotor, said certain angular positions on the rotor being disposed between the radial polarity centers of the rotating flux during synchronous operation of the motor, and said other angular positions on the rotor being in substantial angular alignment with such radial polarity centers at such synchronous operation, said active rotor component being composed of hysteresis magnetic material of a particular coercivity and presenting an essentially uniform flux density path to the rotating flux in the stator bore during synchronous operation of the motor.

4. In an alternating current synchronous motor of the hysteresis type, the combination of: a stator assembly having a bore and including a stator winding for producing a rotating magnetic flux in said bore, a rotor rotatably mounted within the bore of the stator in concentric relationship with the stator to define an annular air gap therebetween, said rotating magnetic flux exhibiting a predetermined number of angularly displaced radial polarity centers and having an essentially sinusoidal distribution in the air gap between such polarity centers, and an active component included in the rotor and having an annular configuration and a varying cross-sectional area which diminishes in a substantially sinusoidal relationship with respect to different angular positions on the rotor from a maximum at certain angular positions on the rotor to a minimum at other angular positions on the rotor, said certain angular positions on the rotor being disposed between the radial polarity centers of the rotating flux during synchronous operation of the motor and said other angular positions on the rotor being in substantial angular alignment with such radial polarity centers during such synchronous operation, said active rotor components being composed of hysteresis magnetic material of a particular coercivity and presenting an essentially uniform flux density path to the rotating flux in the stator bore during synchronous operation of the motor.

5. In an alternating current synchronous motor of the hysteresis type, the combination of: a stator assembly having a bore and including a stator winding for producing a rotating magnetic flux in said bore, a rotor rotatably mounted within the bore of the stator in concentric relationship with the stator and defining an annular air gap with the stator, said rotating magnetic flux having a particular distribution in said annular air gap and exhibiting a predetermined number of angularly displaced radial polarities, and an active member forming an outer component of the rotor and having an annular configuration with a cylindrical-shaped outer surface to define said annular air gap with the stator, said active member having an inner surface shaped to define a varying cross-sectional area for the active member, and said active member being composed of hysteresis magnetic material of a particular coercivity and presenting an essentially uniform flux density path to the rotating flux in the stator bore during synchronous operation of the motor.

6. The combination defined in claim 5 in which said varying cross-sectional area of said active member diminishes with respect to different angular positions on the rotor from a maximum at certain angular positions on the rotor to a minimum at other angular positions on the rotor, said angular positions on the rotor being disposed between the radial polarities of the rotating flux at synchronous operation of the motor and said other angular positions on the rotor being in substantial angular alignment with such radial polarities during such synchronous operation.

7. In combination for use with alternating current apparatus of the hysteresis type having a rotating magnetic flux, a rotor structure including, an active component of hysteresis magnetic material of a particular coercivity having an annular configuration and of a varying cross-sectional area to present a path of essentially uniform flux density to the rotating flux during operation of the alternating current apparatus.

8. In combination for use with an alternating current synchronous motor of the hysteresis type having a rotating magnetic flux exhibiting a predetermined number of angularly displaced radial polarity centers, a rotor structure including, an active component having an annular configuration and a cross-sectional area which diminishes from a maximum at certain angular positions on the rotor to a minimum at other angular positions on the rotor with the certain angular positions on the rotor disposed between the radial polarities of the rotating magnetic flux during synchronous operation of the motor and the other angular positions substantially in angular alignment with the radial polarities during synchronous operation and having the active rotor component composed of hysteresis magnetic material of a particular coercivity and presenting an essentially uniform flux density path to the rotating flux during synchronous operation of the motor.

9. In combination for use with an alternating current synchronous motor of the hysteresis type having a rotating magnetic flux exhibiting a predetermined number of angularly displaced radial polarity centers, a rotor structure including, an active component having an annular configuration and a varying cross-sectional area which diminishes in a substantially linear relationship with respect to different angular positions on the rotor from a maximum at certain angular positions on the rotor to a minimum at other angular positions on the rotor with certain angular positions on the rotor disposed between the radial polarity centers of the rotating flux during synchronous operation of the motor and the other angular positions on the rotor in substantial angular alignment with the radial polarity centers at synchronous operation of the motor and having the active rotor component composed of hysteresis magnetic material of a particular coercivity and presenting an essentially uniform flux density path to the rotating flux during synchronous operation of the motor.

10. In combination for use with an alternating current synchronous motor of the hysteresis type having a rotating magnetic flux exhibiting a predetermined number of angularly displaced radial polarity centers with an essentially sinusoidal distribution between the polarity centers, a rotor structure including, an active component composed of hysteresis magnetic material of a particular coercivity having an annular configuration and a varying cross-sectional area which diminishes in a substantially sinusoidal relationship with respect to different angular positions on the rotor from a maximum at certain angular positions on the rotor to a minimum at other angular positions on the rotor with the certain angular positions on the rotor disposed between the radial polarity centers of the rotating flux during synchronous operation of the motor and the other angular positions on the rotor in substantial angular alignment with the radial polarity centers during synchronous operation of the motor to present an essentially uniform flux density path to the rotating flux during synchronous operation of the motor.

11. In combination for use with an alternating current synchronous motor of the hysteresis type having a rotating magnetic flux exhibiting a predetermined number of angularly displaced radial polarities, a motor assembly, including, an active member composed of hysteresis magnetic material of a particular coercivity forming an outer component of the rotor and having an annular configuration with a cylindrical-shaped outer surface and an inner surface with a varying cross-sectional area to present a uniform flux density path to the rotation flux during synchronous operation of the motor.

12. The combination defined in claim 11 wherein the varying cross-sectional area of the active member diminishes with respect to different angular positions on the rotor from a maximum at certain angular positions on the rotor to a minimum at other angular positions on the rotor with the certain angular positions on the motor disposed between the radial polarities of the rotating flux at synchronous operation of the motor and the other angular positions on the rotor in substantial angular alignment with the radial polarities during synchronous operation.

References Cited in the file of this patent

UNITED STATES PATENTS

| | | |
|---|---|---|
| 2,328,743 | Roters | Sept. 7, 1943 |
| 2,708,724 | Martin et al. | May 17, 1955 |
| 2,870,352 | Williford | Jan. 20, 1959 |

FOREIGN PATENTS

| | | |
|---|---|---|
| 786,751 | Great Britain | Nov. 27, 1957 |